United States Patent Office 3,486,304
Patented Dec. 30, 1969

3,486,304
QUALITATIVE ANALYSIS OF FLUID MIXTURES
Dietrich Jentzsch, Uberlinger am See, and Werner Hövermann, Inzlingen, Baden, Germany, assignors to Bodenseewerk, Perkin-Elmer & Co. G.m.b.H., Uberlingen (Bodensee), Germany
Filed Nov. 9, 1964, Ser. No. 410,025
Int. Cl. B01d 15/08
U.S. Cl. 55—197        4 Claims

ABSTRACT OF THE DISCLOSURE

The various components of the sample mixture are separated, as by using a conventional chromatographic column. Each (or a few) of the separated sample components is adsorbed on a different (or different parts of the same) aluminum oxide foil. Since the aluminum oxide foil is substantially uniformly transparent to infrared radiation, the sample components may be directly analyzed by, for example, infrared absorption spectroscopy. Thus, both qualitative (by the absorption spectroscopy) and quantitative (by the conventional chromatographic detector) results may be obtained in a simple straight forward manner.

---

This invention relates to methods and apparatus for analyzing fluid sample mixtures. More specifically, the mixture is at least partially separated into individual components or groups of these components by chromatographic techniques, and then these groups or components are specifically identified by at least qualitative analytic techniques.

Gas (or liquid) chromatography is a known technique for separating a gas (or liquid) mixture into its component parts. A typical apparatus used for gas chromatography comprises a separating column, often a tube filled with a separating substance. The separating substance has the property of physically interacting with the components of the mixture to be separated by differently, strongly retaining such components. This may be effected by the mixture components being either adsorbed by a solid separating substance or going into solution in a liquid separating substance with different partition coefficients. A continuous flow of mobile phase (i.e., carrier gas) is passed through the separating column, a gas (or liquid) being selected as the carrier or mobile phase which practically does not interact with the separating substance. A defined sample quantity of the mixture to be analyzed is injected into such flow of the carrier or mobile phase, and this quantity is then "rinsed" through the separating column by the mobile phase. During this passage the different components of the analyzed mixture are differently retarded in dependence on the strength with which they are retained by the separating substance, so as to travel through the separating column with different average rates. The components introduced at the entrance of the separating column at the same time, namely as a mixture, therefore appear successively at the exit or outlet end of the separating column.

It is also known to arrange a detector at the exit of the separating column, said detector responding to the quantity or concentration of mixture components in the flow of the mobile phase. The detector signal is then passed on to a recorder which causes the recording of a bell-shaped curve (peak) for each component on a chart, the abscissa of which is the time of appearance. The area below such a curve is representative of the quantity of the respective component in the sample introduced. This method makes it possible to determine the quantitative composition of a mixture, the qualitative composition of a mixture is known. If the qualitative composition of a mixture is known, it may be determined through a calibration test how great is the retention time in the separating column of each individual component; and the moment at which a peak is recorded is then informative of the kind of mixture component involved.

A different problem is presented if the qualitative composition of the sample is also unknown. Gas chromatography is essentially a method of separation. Qualitative analysis is generally not possible with gas chromatography alone, but rather it is necessary to individually identify the substances after their separation by means of gas chromatography. For this purpose the individual component effluents may be condensed in the cooling trap and collected. The composition of the resulting condensate may then be determined with the customary methods of chemical analysis. It is also known to place a mixture component so obtained into a sample cell and spectroscopically analyze the same, generally by the recording of an absorption spectrum in the infrared.

This known method for collecting and determining the components appearing at the exit of the separating column is relatively complicated. A prerequisite is sufficiently large quantities of the mixture components to be analyzed. It is true these may be obtained with conventional packed columns provided that a sufficiently large sample is introduced. This, however, involves difficulties with trace analysis or when using so-called Golay columns wherein the separating substance is arranged on the walls of a long and almost capillary tube, leaving free a longitudinal channel. In such case, minute substance quantities are obtained, which are difficult to collect and analyze with conventional means.

It is the object of the present invention to avoid these difficulties and to render possible a simple collection of even small size components for the purpose of identification.

According to the invention this object is attained by providing that the components are adsorbed by a flat carrier or plate having an adsorbing surface, so that it is not necessary to condense the component to be analyzed in a cooling trap. Thus, minute quantities, which could not be handled in a cooling trap, may be analyzed, and the required amount of apparatus is small.

The sample components adsorbed on the flat solid carrier plate may then be analyzed qualitatively. This may, for instance, be effected by spot reactions. It is, however, particularly advantageous if the adsorbing plate is substantially transmitting in a given spectral range and the sample component adsorbed thereon is identified by the use of a spectrometer. Thus, small traces of a substance adsorbed at the carrier may be detected and identified spectroscopically. The infrared spectrum is particularly suitable for that purpose with most substances.

The invention may be carried out by feeding the gas eluted from a normal separating column, preferably after passage through a detector for the quantitative determination, to an adsorbing flat carrier so that the component appearing first is adsorbed at the carrier. Thereafter, the carrier is exchanged and may be spectroscopically analyzed for the purposes of identification of such component, while a new carrier for the collection of the next component is positioned in the flow of the mobile phase.

However, the invention may also be accomplished in such manner that the mixture components are "rinsed" across the surface of the carrier by a continuous flow of the mobile phase. Then, the carrier itself acts like a separating column. Such a "separating column" may be arranged at the exit of a separating column of customary design, and the components issuing from the latter (conventional) separating column successively travel across the carrier one by one. Thereby, the chronological sequence of the components at the exit of the separating column is converted into a spatial side-by-side arrangement on the carrier. When the mobile phase (carrier gas) is stopped, the components will be positioned at spatially separated locations.

Then, the identification of the components may be effected (after stopping the flow of the mobile phase) by passing radiation through successive areas or lines of the carrier (preferably progressing in the original direction of the flow of mobile phase) through the entrane slit of a monochromator for spectroscopic analysis. Since there are different "spots" or locations haivng different mixture components, if the monochromator slit is positioned before such a spot, then the absorption spectrum characteristic of the respective substance is obtained by a spectrally scanning spectrophotometer or the like. During the "spot" scanning of the carrier, the different spectra of the mixture components are thus obtained successively.

The invention may also be accomplished by placing a plurality of successive carriers in the flow of mobile phase issuing from the separating column. The components travel across the successive carriers in the direction of the flow of mobile phase; and an instant may be watched for when the different components are positioned on essentially different carriers, so as to then remove the carriers and spectroscopically analyze them individually. To obtain the correct timing, it is advantageous to provide intermediate detectors between the carriers to monitor the transition of the mixture components from one carrier to the next.

The arrangements (hereinbefore described) of adsorbing carriers with flow of mobile phase directed thereacross may be arranged at the exit of a customary separating column and thus roughly correspond to conventional sample collection devices. It is possible, however, that in certain cases no conventional separating column is used at all, as the carrier arrangement according to the invention itself acts like a separating column. Then, the "separating column" made up of the series of carriers makes it possible to spectroscopically analyze the "packets" of mixture components separated spatially in the "column" before their emergence therefrom (i.e., during the stay thereof in the column).

The flat carriers themselves are preferably formed of a foil or sheet of aluminum oxide. Aluminum oxide is transmitting in the infrared and adsorbs fluids well. The aluminum oxide may be produced in filmy foils if an aluminium surface is oxidized electrolytically, and the non-oxidized aluminum is then dissolved chemically.

Although the objects and general description of the invention have been given above, a more complete understanding of the invention will be obtained from the following detailed description of various exemplary embodiments of the invention, with reference to the accompanying drawings, in which:

FIGURE 1 shows the adsorption spectrum (that is, transmission versus wavelength) of an aluminum oxide foil produced in the manner as hereinbefore described through electrolytic oxidation of an aluminum surface and solution of the aluminum which has not been oxidized. It can be seen that the transmission is substantially constant in a range of 2.5 to 10 microns and is approximately 90%.

Figure 1:
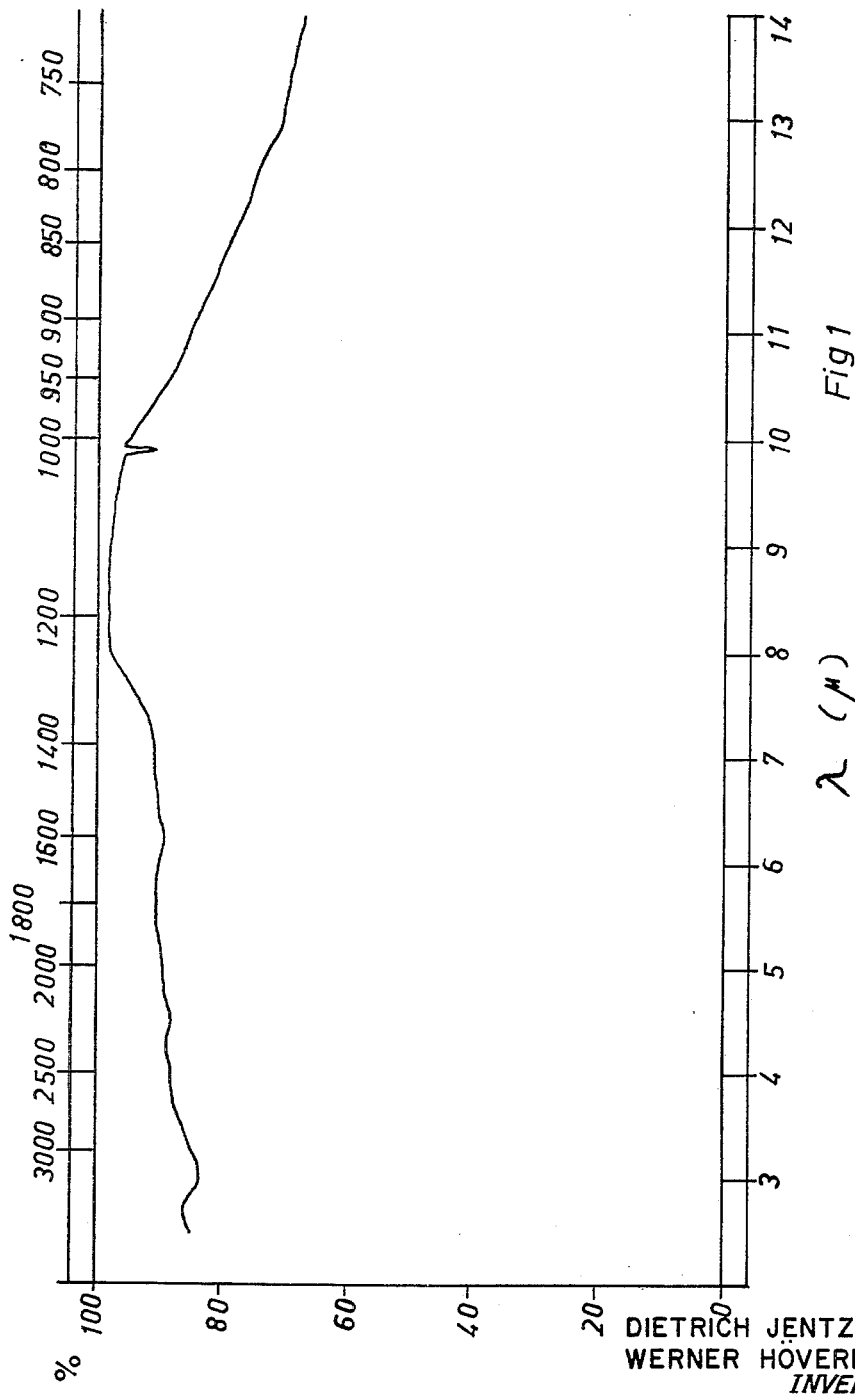
FIGURE 1 shows the spectral transmission of an aluminum oxide foil of the type utilized in the invention.
Figure 2:
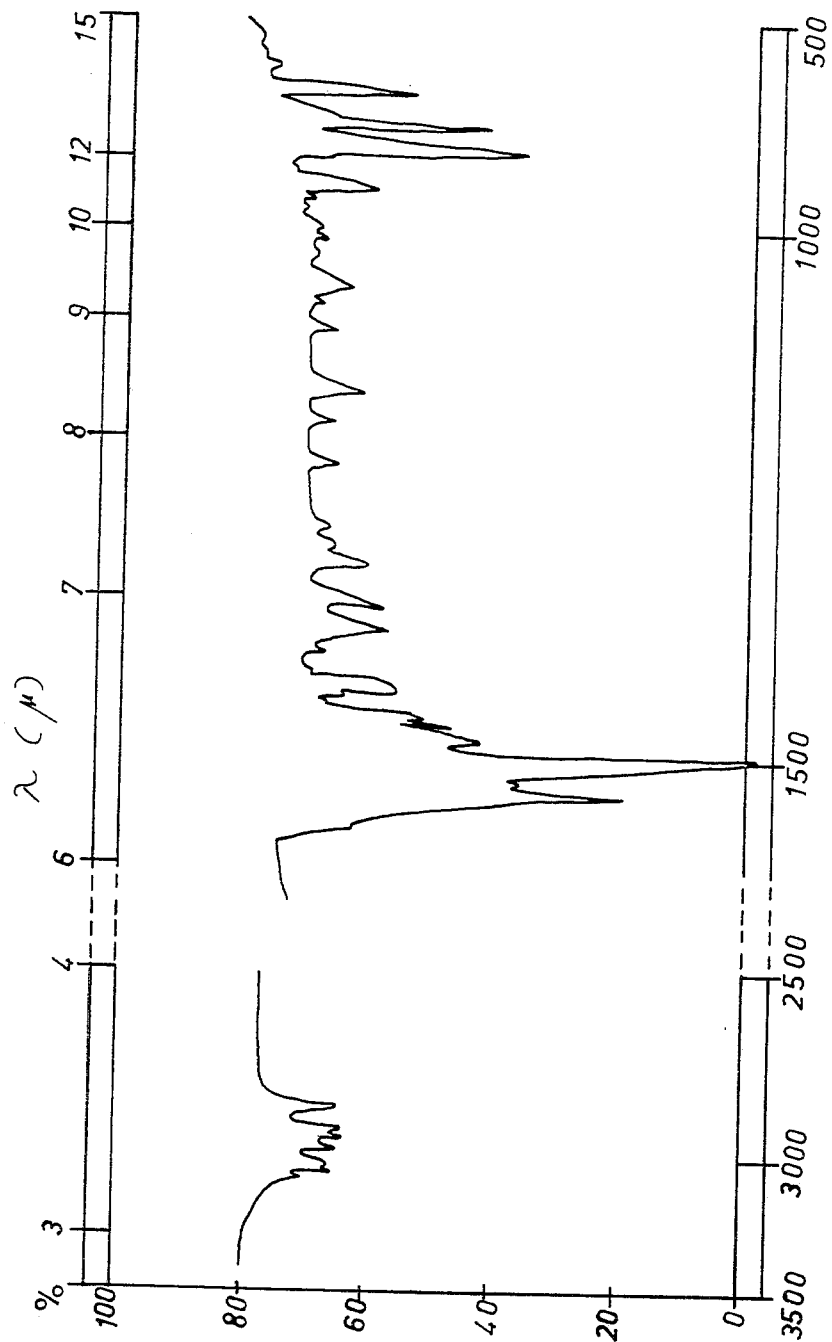
FIGURE 2 shows the spectrum of such a foil with a substance adsorbed thereat of a chromatographically separated mixture.

FIGURE 2 shows the transmission of such an aluminum foil after a substance has been adsorbed at the surface thereof, which substance has been separated from a mixture by means of gas chromatography. In particular, the gas effluent from the separating column was fed onto the aluminum oxide foil when a certain sample mixture component appeared, as determined by a particular peak in the detector at the column output. The absorption peaks of the adsorbed substance can be clearly seen. The peaks were recorded with a fivefold ordinate extension. The recorded spectrum renders possible immediate identification of the substance.

Figure 3:
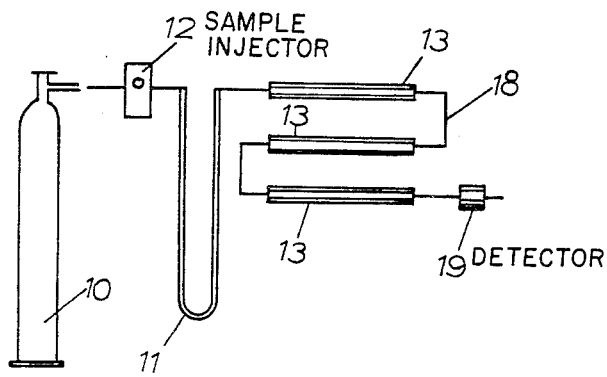
FIGURE 3 is a schematic illustration of an arrangement wherein the eluate of a chromatographic separating column is successively conducted across several adsorbing flat carriers by the flow of the mobile phase, with the detector following the carriers.
Figure 6:
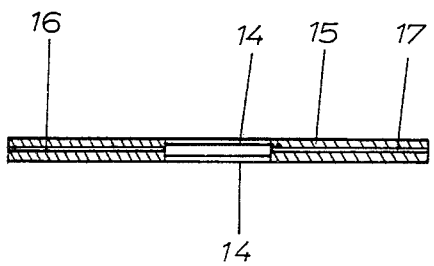
FIGURES 6 and 7 show the design and two arrangements of the adsorbing carriers in detail.

In FIGURE 3 reference numeral 10 designates a mobile phase source which feeds a continuous flow of mobile phase (i.e., carrier gas or liquid) through a separating column 11. Into the flow of the mobile phase a specific quantity of a sample mixture to be analyzed is introduced by means of a conventional sample injector 12. The individual components of the mixture appear successively at the exit of the separating column 11. To the exit end of the separating column 11 are connected adsorbing sections 13, formed of flat aluminum oxide foils 14 (see FIGURE 6 or 7), which define a narrow rectangular channel therebetween and are inserted in a frame-like housing 15 having inlet and outlet capillaries 16, 17. These sections are connected in series by means of capillaries 18. At the exit of the path of flow a detector 19 is positioned, which detector may be of the conventional chromatographic type.

The sections 13 with the adsorbing aluminum oxide foils constitute a continuation of the chromatographic separating column 11, and the "packets" of the different mixture components travels one by one through the aluminum foil sections 13. Thus, at a certain time one component may be located in the first section 13, a second component in the next one and a third component in the last section. At that moment the flow of the mobile phase may be interrupted, the aluminum oxide foils removed and then the three components on the foils individually analyzed spectroscopically. In this arrangement the detector 19 only serves the purpose of assuring that no component may escape and therefore evade being analyzed.

Figure 7:
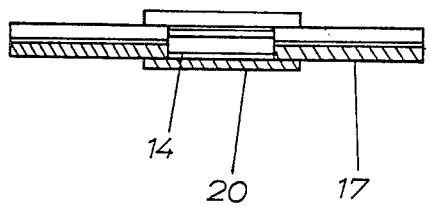

In the case of very thin aluminum oxide foils it is expedient to have the foils 14 surrounded additionally by a gas-tight housing or shell 20, as illustrated in FIGURE 7, since the aluminum oxide foil may not be absolutely gas-tight.

Figure 4:
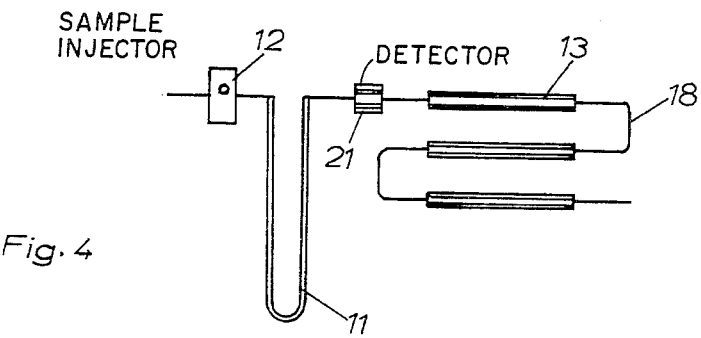
FIGURES 4 and 5 show similar arrangements with different arrangement of the detectors.

FIGURE 4 shows an arrangement similar to that of FIGURE 3, differing however in that the detector 21 is at the exit of the separating column 11 before the sections 13. Thereby, not only the chronological sequence of the individual peaks may be monitored, but also the quantity of the respective substance components may be measured in the customary manner from the area below the detected peaks.

Figure 5:
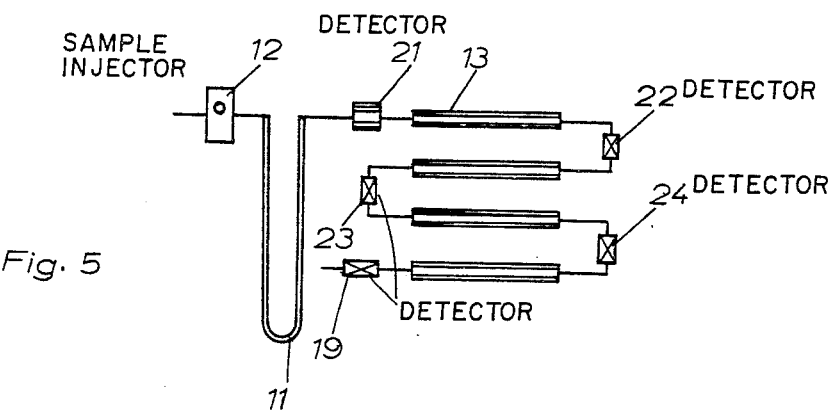

It is, of course, desirable that the travel of the mixture components across the various adsorbing foils should be monitored for the total path thereof. An arrangement accomplishing this is illustrated in FIGURE 5. In addition to a detector 21 arranged directly at the exit of the separating column 11 and a detector 19 positioned at the end of the whole system, further detectors 22, 23, 24 are provided between each of the sections 13, which permit monitoring the transition between the sections.

Figure 8:
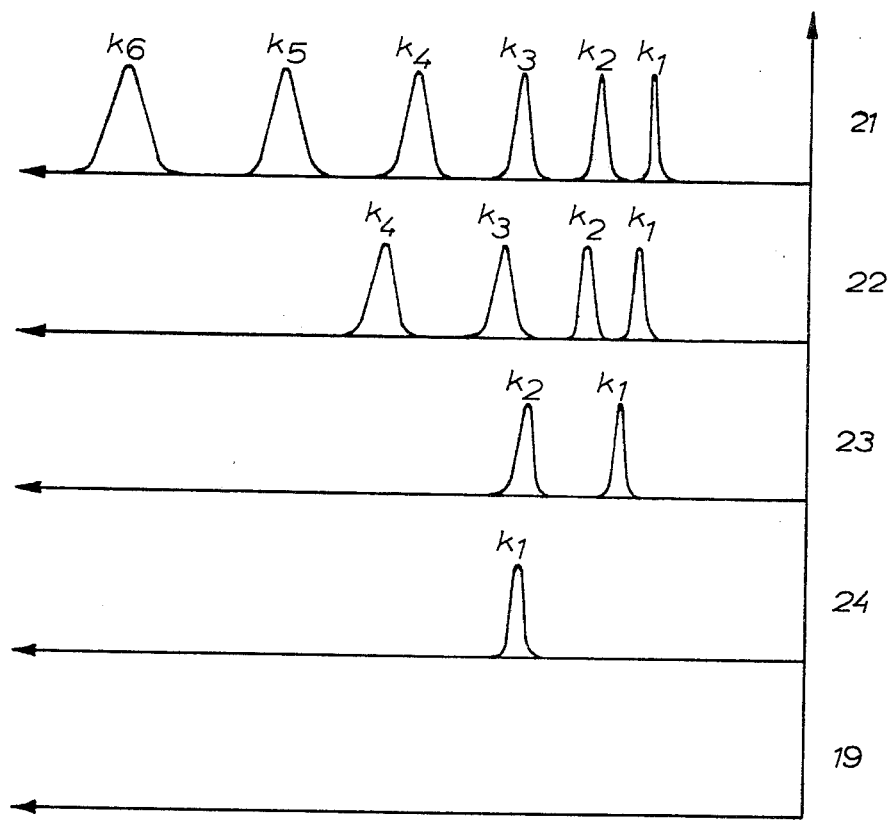
FIGURE 8 illustrates the detector signals with the arrangement in FIGURE 5.

FIGURE 8 illustrates the chromatograms supplied by the detectors up to a specific moment. The output of detector 19 (at the bottom of FIGURE 8) indicates that no component has as yet left the system. Detector 24 indicates that the component $k_1$ is in the fourth (last) section 13 of the system (since it has passed detector 24 but not detector 19). From the chromatograms of the detectors 23 and 24 it can be gathered that only the component $k_2$ is in the third section, since $k_1$ has entered into this section through detector 23 but has also already left through detector 24. Accordingly, it may be derived from the chromatograms of the detectors 22 and 23 that the components $k_3$ and $k_4$ are still in the second section, for $k_1$, $k_2$, $k_3$ and $k_4$ have entered into the second section through detector 22 and only $k_1$ and $k_2$ have already left the same past detector 23. As can be seen from the chromatograms supplied by the detectors 21 and 22, the components $k_5$ and $k_6$ are still in the first section. Thereby, the travel of the sample components may be traced, and the correct moment be determined to remove and spectroscopically analyze the aluminum oxide foils.

Although "gas" has been generally used throughout the preceding specification as the exemplary physical state of the sample and mobile phase, liquid samples and mobile phases may also be utilized with the invention.

We claim:

1. In a chromatographic separating apparatus of the type comprising a conventional chromatographic separating column composed of a relatively long tube containing a separating substance to provide a chromatographically active surface extending in a longitudinal direction, along which an entering mobile phase for carrying the sample substance intended to be separated into its components travels in an open longitudinal channel defined thereby toward its output end;

the improvement wherein a plurality of removable flat carriers in series relationship are connected to the output end of said conventional separating column to comprise further sections of said chromatographically active surface;

said flat carriers defining an open channel having a cross-section which is elongated in the transverse having a cross-section which is elongated in the transverse direction, perpendicular to said longitudinal mobile phase flow direction but parallel to the active surface of said flat carrier;

each of said flat carriers comprising at least one thin aluminum oxide foil, substantially uniformly transmitting in a spectral range suitable for spectroscopic qualitative analysis.

2. The apparatus of claim 1, in which:

each of said flat carriers comprises a pair of substantially parallel, facing foils.

3. The apparatus of claim 1, in which:

each of said flat carriers comprises in addition to said foil an enclosing gas-tight housing.

4. The apparatus of claim 1, in which:

detectors are positioned between at least some of said flat carriers, so as to monitor the transition passage of the various separated sample components from one such carrier to the next successive carrier.

References Cited

UNITED STATES PATENTS

| | | | |
|---|---|---|---|
| 3,229,505 | 1/1966 | Sanford et al. | 210—31 X |
| 3,267,646 | 8/1966 | Kauss et al. | 73—23.1 X |
| 3,279,307 | 10/1966 | Wilks. | |
| 3,289,527 | 1/1966 | Gilford et al. | |
| 3,301,040 | 1/1967 | Levy et al. | 73—23.1 |

RONALD L. WIBERT, Primary Examiner

F. L. EVANS, Assistant Examiner

U.S. Cl. X.R.

73—23.1; 210—31; 356—38, 72, 74, 244